F. BADE.
PERCUSSIVE TOOL MACHINE.
APPLICATION FILED MAY 19, 1911.

1,041,569.

Patented Oct. 15, 1912.

UNITED STATES PATENT OFFICE.

FRANZ BADE, OF PEINE, GERMANY.

PERCUSSIVE-TOOL MACHINE.

1,041,569. Specification of Letters Patent. Patented Oct. 15, 1912.

Application filed May 19, 1911. Serial No. 628,284.

*To all whom it may concern:*

Be it known that I, FRANZ BADE, a subject of the German Emperor, residing at Peine, in Germany, have invented certain new and useful Improvements in Percussive-Tool Machines, of which the following is a specification.

This invention relates to portable rock-drills and other machines for working stone and the like by means of percussive tools operated by an electric motor forming part of the machine.

In machines of this class lightness and simplicity are of great importance, more particularly if the apparatus is to work while merely held by hand, without fixed support, and the object of the present invention is to provide certain improvements in this respect.

The invention is illustrated in the accompanying drawing, in which—

Figure 1:
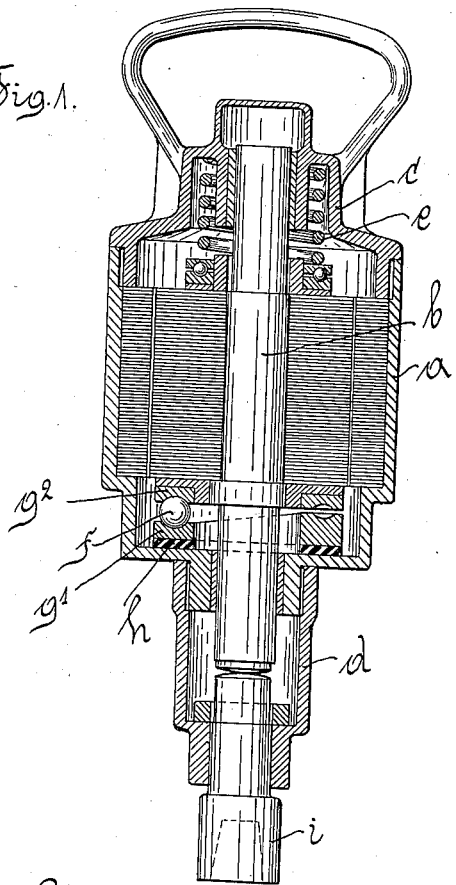
Figure 2:
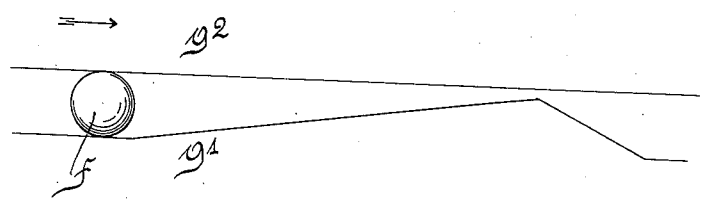

Figure 1 is a longitudinal section of the machine, and Fig. 2 a diagram illustrating a detail thereof.

The motor comprises the stator $a$ and axially movable rotor $b$, the cover $c$ of the motor case being formed with a handle. A tubular piece $d$ fixed to the front end of the stator forms a guide for the axially movable tool $i$. The rotor is thrust by a spring $e$ against a ball $f$, which works between two grooved race-plates $g^1$, $g^2$, the plate $g^2$ being fixed to the rotor and the plate $g^1$ being fixed to an elastic ring $h$ in the motor casing. The groove in the plate $g^2$ is level, but the plate $g^1$ is a cam-plate, having a ridge or elevation, gently rising on one side and more steeply inclined on the other, as shown in Fig. 2.

When the motor is working the ring $g^2$, rotated by the rotor, drives the ball $f$ around its race, and the ball, traveling up the gentle incline, forces the rotor rearward and compresses the spring $e$. When the ball has passed the crest of the incline, the spring thrusts the rotor forward, so that the rotor spindle acts by percussion on the tool $i$. The cushioning ring $h$ absorbs shock, and equalizes the impact.

The tool used may be either a percussive boring tool or a chisel or the like.

What I claim as my invention and desire to secure by Letters Patent of the United States is:—

1. In a percussive tool machine the combination of a casing having a tool guide and bearings for a rotor, a stator mounted in said casing, an axially reciprocatable rotor having a shaft mounted in said bearings, a percussive tool positioned in the path of the axial movement of said shaft, and means within the casing for reciprocating said rotor during its rotation.

2. In a percussive tool machine the combination of a casing having a tool guide and bearings for a rotor, a stator mounted in said casing, an axially reciprocatable rotor having a shaft mounted in said bearings, a percussive tool positioned in the path of the axial movement of said shaft, a cam device within the casing whereby axial movement in one direction is imparted to said rotor during its rotation, and a spring bearing on said rotor in the opposite direction.

3. In a percussive tool machine the combination of a casing having a tool guide and bearings for a rotor, a stator mounted in said casing, an axially reciprocatable rotor having a shaft mounted in said bearings, a percussive tool positioned in the path of the axial movement of said shaft, a cam-plate within the casing having a ball race, a ball in said race, and a spring axially thrusting the rotor against said ball, so that the rotor is reciprocated during its rotation.

In witness whereof I have signed this specification in the presence of two witnesses.

FRANZ BADE.

Witnesses:
CARL SCHURIGER,
CARL DELIUS.